(12) United States Patent
Kawaguchi

(10) Patent No.: US 7,009,986 B2
(45) Date of Patent: Mar. 7, 2006

(54) NETWORK APPARATUS

(75) Inventor: Shinichi Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 890 days.

(21) Appl. No.: 09/888,383

(22) Filed: Jun. 26, 2001

(65) Prior Publication Data

US 2002/0018460 A1    Feb. 14, 2002

(30) Foreign Application Priority Data

Jun. 27, 2000  (JP) ............................. 2000-193479

(51) Int. Cl.
*H04L 12/28* (2006.01)
*H04L 12/56* (2006.01)
(52) U.S. Cl. ...................... 370/406; 370/907; 370/405
(58) Field of Classification Search ........ 370/403–406, 370/907; 307/403–406, 907
See application file for complete search history.

(56) References Cited

U.S. PATENT DOCUMENTS

| 5,313,645 A | * | 5/1994 | Rolfe ........................... 712/11 |
| 5,383,191 A | | 1/1995 | Hobgood et al. |
| 5,546,403 A | | 8/1996 | Yamamoto et al. |
| 6,041,056 A | * | 3/2000 | Bigham et al. ........ 370/395.64 |
| 6,108,340 A | * | 8/2000 | Rolfe et al. .................. 370/406 |
| 6,798,747 B1 | * | 9/2004 | Watkins et al. .............. 370/238 |

FOREIGN PATENT DOCUMENTS

| JP | 56-040344 | 4/1981 |
| JP | 07-231326 | 8/1995 |

OTHER PUBLICATIONS

Harald Richter et al., "Performance Optimizations of Switched SCI-Rings", XP-002343469, 11th Annual International Symposium on High Performance Computing Systems, Winnipeg, Manitoba, Jul. 10-12, 1997, pp. 1-10.

* cited by examiner

Primary Examiner—Chi Pham
Assistant Examiner—Ronald Abelson
(74) Attorney, Agent, or Firm—Young & Thompson

(57) ABSTRACT

A network apparatus establishes complete crossbar contact for N basic elements each having the capability to function as one computer. A switch device group having N switch devices is connected to each basic element. Each switch device group is composed of a first switch device that is connected directly to a basic element, a second switch device that is connected to the first switch device, a third switch device that is connected to the second switch device, and so on to a final Nth switch device that is connected to an (N-1)th switch device. The network apparatus includes N loop lines, each loop line connecting one switch device in each switch device group in a loop without duplication. A basic element and a first switch device are bidirectionally connected for input and output of data, and each of the switch devices that make up a switch device group are unidirectionally connected for transferring data in one direction toward the first switch device.

15 Claims, 14 Drawing Sheets

NETWORK APPARATUS

BACKGROUND OF THE INVENTION

1. Field of the Invention

The present invention relates to a network apparatus of a large-scale computer system configured such that a plurality of basic elements each having the capacity to operate as one computer are connected by a complete crossbar system.

2. Description of the Related Art

Due to its superior performance, a complete crossbar scheme is generally the most preferred scheme for interconnecting a plurality of basic elements so as not to cause data contention. A complete crossbar scheme means a communication system design in which each distinct pair of basic elements in communication with each other are connected through a different data-communication path; and a way of connection that realizes the complete crossbar scheme using devices having the capability to switch paths is referred to as complete crossbar connection.

One example of the prior art for realizing complete crossbar connection is a network that connects a plurality of basic elements using a single-stage crossbar system (provided as LSI) that realizes complete crossbar connection. Such a network has the advantages of good performance and easy control. Complete crossbar connection using a single-stage crossbar system is next described with reference to FIGS. 1 and 2.

FIG. 1 shows a prior-art example of a network in which complete crossbar connection is realized using one single-stage crossbar apparatus. This network is referred to hereinbelow as the first prior-art network.

As shown in FIG. 1, the first prior-art network is made up of basic elements (100-0)–(100-*n*) and single-stage crossbar apparatus 200 bidirectionally connected to each basic element. This network of the prior art realizes complete crossbar connection through the use of a single single-stage crossbar device having a switching function for connecting the basic elements.

However, the complete crossbar connection realized in this first prior-art network may entail long distances from the single-stage crossbar apparatus to newly added basic elements as the number of basic elements connected to the network increases. Such a case results in longer cables, and this gives rise to the problem of cable length limitations, such as the problem that normal communication becomes impossible depending on the transmission rate and the problem of the difficulty of maintaining cables as well as the problem of the high expense of the cables, as their length increases.

In addition, in complete crossbar connection as realized by the first prior-art network, an increase in the number of basic elements to be connected necessitates an increase in the number of LSI gates and ports required for switching functions, thus giving rise to the problem of package limitations, such as the problem that the number of required connections exceeds the hardware limits of the single-stage crossbar device itself, and the single-stage crossbar device can no longer accommodate to the problem.

A connection method using a plurality of single-stage crossbar devices has been adopted to overcome the above-described package limitations. FIG. 2 shows an example of a network in which complete crossbar connection is realized using a plurality of single-stage crossbar devices. This prior-art example is hereinbelow referred to as the second prior-art network.

As shown in FIG. 2, the second prior-art network is made up of basic elements (100-0)–(100-*n*) and single-stage crossbar devices (200-0)–(200-*m*) bidirectionally connected to each basic element. In this prior-art network, the width of data is divided and assigned to each individual single-stage crossbar device, thereby reducing the data width to be processed by one single-stage crossbar device to limit the number of gates and ports required for each single-stage crossbar device, thereby enabling a solution to the above-described problem regarding package limitations.

With further increases in the number of connected basic elements, however, the complete crossbar connection that is realized in the second prior-art network still necessitates single-stage crossbar devices having a number of ports depending on the number of connections and requires that data width must be further divided. In such cases, the problem arises that, in addition to the previously described package limitations, data cannot be divided beyond a minimum unit of division, i.e., there is a limit to the division of data width.

In the case of a so-called centralized crossbar method in which a plurality of basic elements are connected to one network apparatus as in the above-described first and second prior-art networks, isolating the point of a breakdown is problematic when a breakdown occurs at some point in the network nodes, and this results in the problem that the effect of a breakdown is likely to have repercussions throughout the interconnected network system. There is also the problem that the functions of the entire interconnected network system must be halted when exchanging a failed device inside the device at a particular point in the network nodes.

As a countermeasure for this problem, multi-stage complete crossbar connection has been adopted instead of a single-stage complete crossbar connection, whereby, when a breakdown occurs at a particular point, the effect of the breakdown has been avoided by using a substitute path. As an example of the prior art for realizing multi-stage complete crossbar connection, a third prior-art network that uses a complete crossbar LSI will next be described with reference to FIG. 3.

As shown in FIG. 3, the third prior-art network is made up of: basic elements (100-0)–(100-*n*); first-layer complete crossbar LSI (300-0)–(300-*j*) connected to each basic element; and intermediate layer complete cross-bar LSI (400-0)–(400-*j*) connected to each first-layer complete crossbar LSI.

This network can be configured as a network of a large scale, as a whole, having a complete crossbar-connection configuration by stacking comparatively small-scale complete crossbar units in a plurality of layers, and moreover, enables avoidance of a breakdown at a particular location through the use of a plurality of paths.

However, complete crossbar connection realized by the third prior-art network entails an increase in the number of complete crossbar units in each layer with increases in the number of basic elements to be connected to the network. This increase in complete crossbar units results in an increase in the length of cables connecting the complete crossbar devices in each layer and gives rise to the problem of the cable length limitations.

Furthermore, since the multistage complete crossbar connection in the third prior-art network provides a plurality of paths connecting each of the basic elements, it necessitates a means for effectively controlling the use of the plurality of paths to accommodate increases in the number of basic elements as well as the number of complete crossbar units.

To cope with this problem, a routing control circuit for controlling the employed paths is provided within a complete crossbar unit. There is the problem, however, that the control circuit becomes complex with the increase in the number of paths accompanied by an increase in the scale of the network.

The present invention has been made in view of the above-described problems of the prior art. It is an object of the present invention to provide a network apparatus that keeps cable length unchanged despite increase in the number of connected basic elements and that allows the construction of a network of any scale while keeping the devices for interconnecting basic elements both small-scale and simple.

It is another object of the present invention to provide a network apparatus capable of constructing a network that, in the event of a breakdown at a particular point of a network node, simplifies the setting of a substitute path without affecting the overall network.

SUMMARY OF THE INVENTION

The first network apparatus of the present invention for solving the above-described problems: is a network apparatus that interconnects two or more (=N) basic elements each having the capability to function as one computer; is configured such that each switch device group having N switch devices is connected to each basic element of N basic elements, each switch device group being electrically configured such that a first switch device is connected directly to a basic element, a second switch device is connected to the first switch device, a third switch device is connected to the second switch device, and so on up to a final Nth switch device being connected to a N-1)th switch device; and moreover, includes N loop lines that connect in a loop one switch device of each switch device group without duplication (without selecting the same device twice).

Thus, according to the first network apparatus of the present invention, the switch device groups are arranged in loops. As a result, all of the basic elements may be connected by connecting adjacent switch device groups, the combinations of interconnected switch device groups being unlimited. This configuration therefore has the advantage of keeping constant the cable length for connection.

In addition, the first network apparatus of the present invention is characterized in that, if a number n (where $1 \leq n \leq N$) denotes an nth switch device, the loop line connects a switch device of each switch device group in a loop such that the switch device numbers increase one by one with progression around the loop line in either a clockwise or counter-clockwise direction and such that the switch device of switch device number N is connected to the switch device of switch device number 1.

As a result, all basic elements have exclusive loop lines, and a pair of different basic elements that are engaged in communication are given distinct connections, i.e., complete crossbar connection can be realized. This configuration has the advantage that contention does not occur between different communication data.

In the first network apparatus of the present invention, moreover, each basic element and the previously described first switch device are bidirectionally connected for input and output of data.

Since bidirectional connection for data communication need only be established between each basic element and one switch device, this configuration has the advantage of simplifying the connection of basic elements even in the event of increase in the number of switch devices of the above-described network apparatus that accompanies increase in the number of basic elements that constitute the network.

In the first network apparatus of the present invention, moreover, each of the switch devices that constitute a switch device group is unidirectionally connected toward the first switch device for one-way transfer of data.

In a preferred embodiment of the present invention, connections between each of the switch devices that make up the loop lines are bidirectional connections for data transfer.

According to the network apparatus of this embodiment, the direction of data transmission in a loop can be either forward or reverse, and for example, if a breakdown should occur at a switch device within a particular switch device group and that switch device group therefore becomes unusable, a substitute connection can be set for only data transmission to switch device groups that are downstream from the failed switch device group in which the direction of data transmission is the reverse direction of the loop lines.

As a result, this embodiment has the advantage that, in the event of a breakdown in a particular switch device group, data transmission to switch device groups other than that switch device group can be continued, and the repercussions of a local breakdown upon the entire network can therefore be avoided.

According to the first network apparatus of the present invention, when data attached with destination information is transmitted from a basic element and sent to a loop line for the exclusive use of that basic element (a loop line connected to a first switch device in connection with that basic element), the switch device within the switch device group that is connected to a destination basic element normally receives the data and transfers the data to the destination basic element.

However, if there is an error in the information that has been attached to the data or if normal data reception cannot be achieved due to a breakdown in a switch device within the destination switch device group, the transmitted data returns to the source basic element by way of the loop line for exclusive use by the source basic element. Bidirectional communication by means of a loop line therefore has the advantage of enabling easy detection of data for which normal transfer could not be achieved by the loop connections of the loop line.

Each of the switch devices that constitute each switch device group of the network apparatus of the present invention includes:

a first port exclusively for receiving data attached with destination information that are sent from an adjacent switch device in the same switch device group;

a second port exclusively for receiving data attached with destination information that are sent from a basic element only if the switch device is a switch device that is directly connected to that basic element;

a third port and a fifth port for both input and output, the ports being connected to an adjacent switch device by way of the loop line;

first and second decoders for judging whether data attached with destination information received from the third port and fifth port are communication addressed to a basic element connected to the switch device group concerned or communication addressed to a basic element connected to another switch device group;

a switch unit for, in a case in which it is judged by the first and second decoders that data attached with destination information are addressed to a basic element connected to the switch device group concerned, selecting either that data attached with destination information or data attached with destination information that have been received from the first port;

first and second repeaters for, in a case in which it is judged by the first and second decoders, respectively, that data attached with destination information are not addressed to a basic element connected to the switch device group concerned, repeating the data attached with destination information;

first and second selectors for selecting one of: data attached with destination information that have been sent from the first and second repeaters, respectively; and data attached with destination information that are received from the second port; and sending selected data to the fifth port or third port for input/output, respectively; and a fourth port exclusively for sending data attached with destination information that have been selected by the switch unit to a switch device adjacent in the direction of the first basic element in the switch device group concerned or to the basic element.

The use of a switch device configured as described above enables the configuration of a network apparatus from switching circuits of a smaller scale than in the complete crossbar connection used in a single-stage crossbar device of the prior art. This configuration therefore has the advantage of enabling the realization of a complete crossbar of a large-scale network using small-scale switching circuits.

In addition, because the construction of switching devices inside the network apparatus is uniform despite increase in the number of basic elements to be connected to the network, the first network apparatus of the present invention has the advantage of circumventing the problem of package limitations of the network apparatus that accompanies increases in the number of basic elements.

In the above-described network apparatus, the first and second selectors of the switch device that is directly connected to the basic element by way of the second port can select exclusively data attached with destination information received from the second port and send the selected data to the fifth port or to the third port.

The first and second selectors of a switch device connected to an adjacent switch device in the same switch device group by way of the fourth port can make a fixed selection of only data attached with destination information sent from the first and second repeaters, respectively, and send the selected data to the fifth port or to the third port.

The second network apparatus of the present invention is a network apparatus that interconnects two or more (=N) basic elements each having the capability to function as one computer.

Each switch device group has N switch devices and is connected to each pair of 2N basic elements that form N pairs. Each switching device group is electrically configured such that a first switch device is connected directly to a pair of basic elements, a second switch device is connected to the first switch device, a third switch device is connected to the second switch device, and so on up to a final Nth switch device being connected to the (N-1)th switch device.

The network apparatus moreover includes N loop transmission paths, each connecting one switch device from each switch device group without repetition (without selecting the same device twice) together:

the loop transmission paths connect switch devices of each switch device group in loops such that, if a number n denotes an nth switch device (where $1 \leq n \leq N$), the switch device numbers increase with progression in either a clockwise or counterclockwise direction around the loop transmission path and such that the switch device having switch device number N is connected to the switch device having switch device number 1;

each basic element of the basic element pairs and the first switch device are bidirectionally connected for the input and output of data; and each of the switch devices that make up each of the switch device groups is unidirectionally connected for transferring data in one direction toward the first switch device.

As a first working example of the second network apparatus of the present invention, each loop transmission path of the N loop transmission paths is composed of two loop lines, whereby two basic elements that are connected to the same switch device group can communicate with a basic element connected to another switch device group through different loop lines.

As a second working example of the second network apparatus of the present invention, each loop transmission path of the N loop transmission paths are composed of one loop line, and two basic elements are connected to the same switch device group and can communicate with a basic element that is connected to another switch device group through the same loop line.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Referring now to the accompanying drawings, the network apparatuses of the embodiments of the present invention are described.

Figure 1:
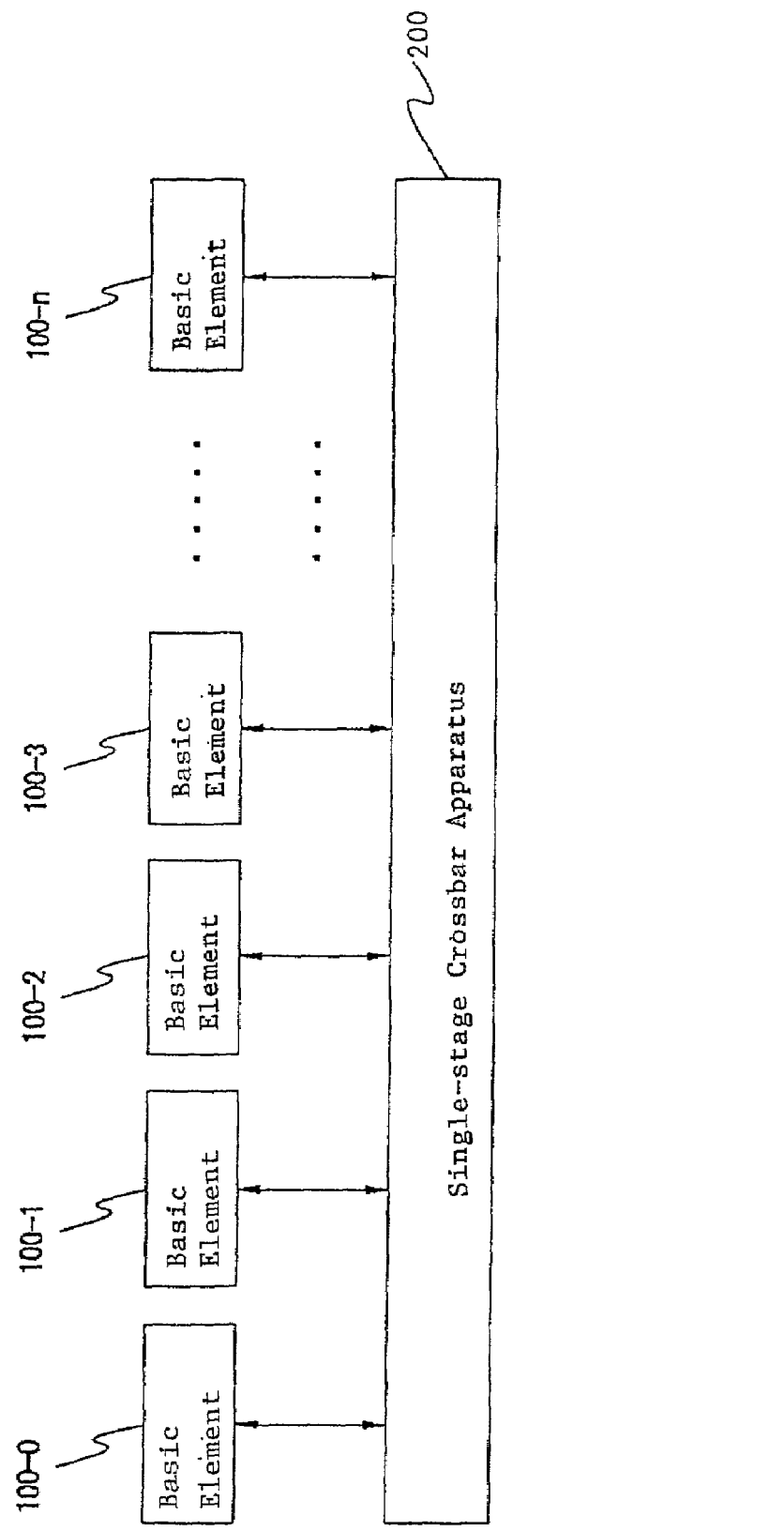
FIG. 1 shows the first prior-art network.
Figure 2:
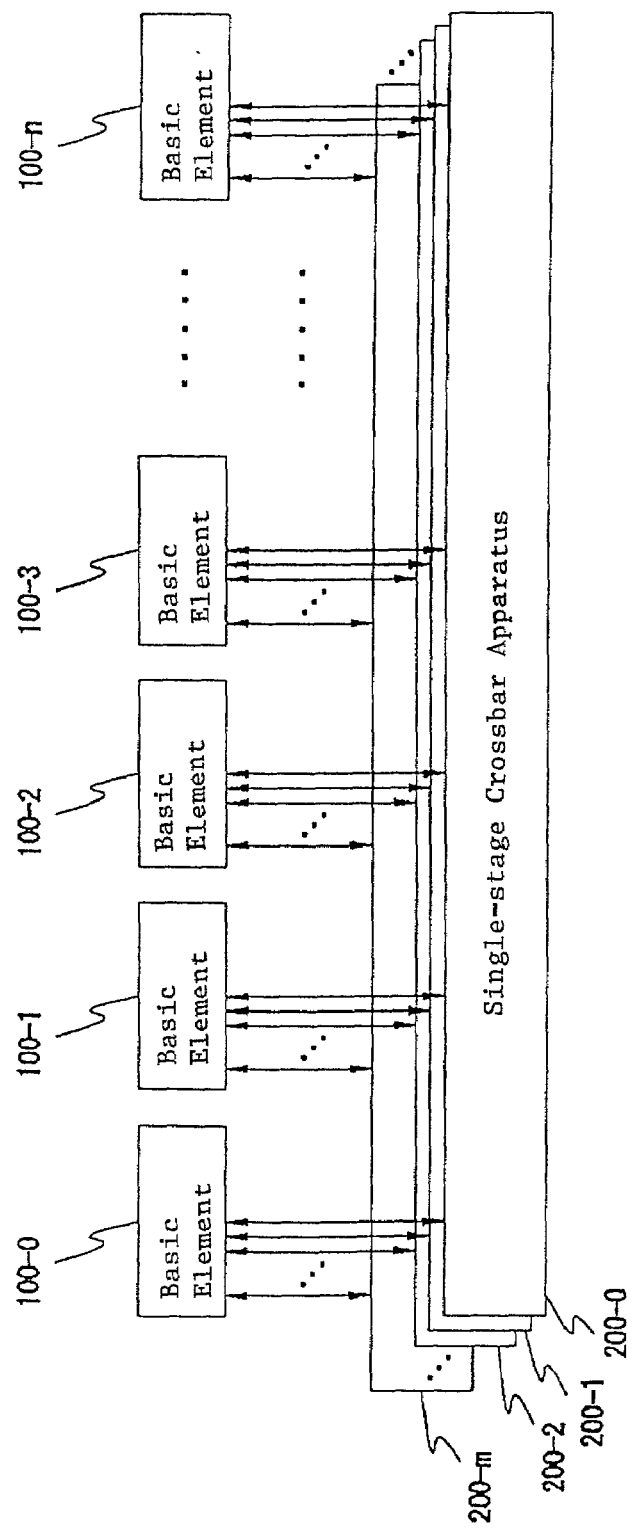
FIG. 2 shows the second prior-art network.
Figure 3:
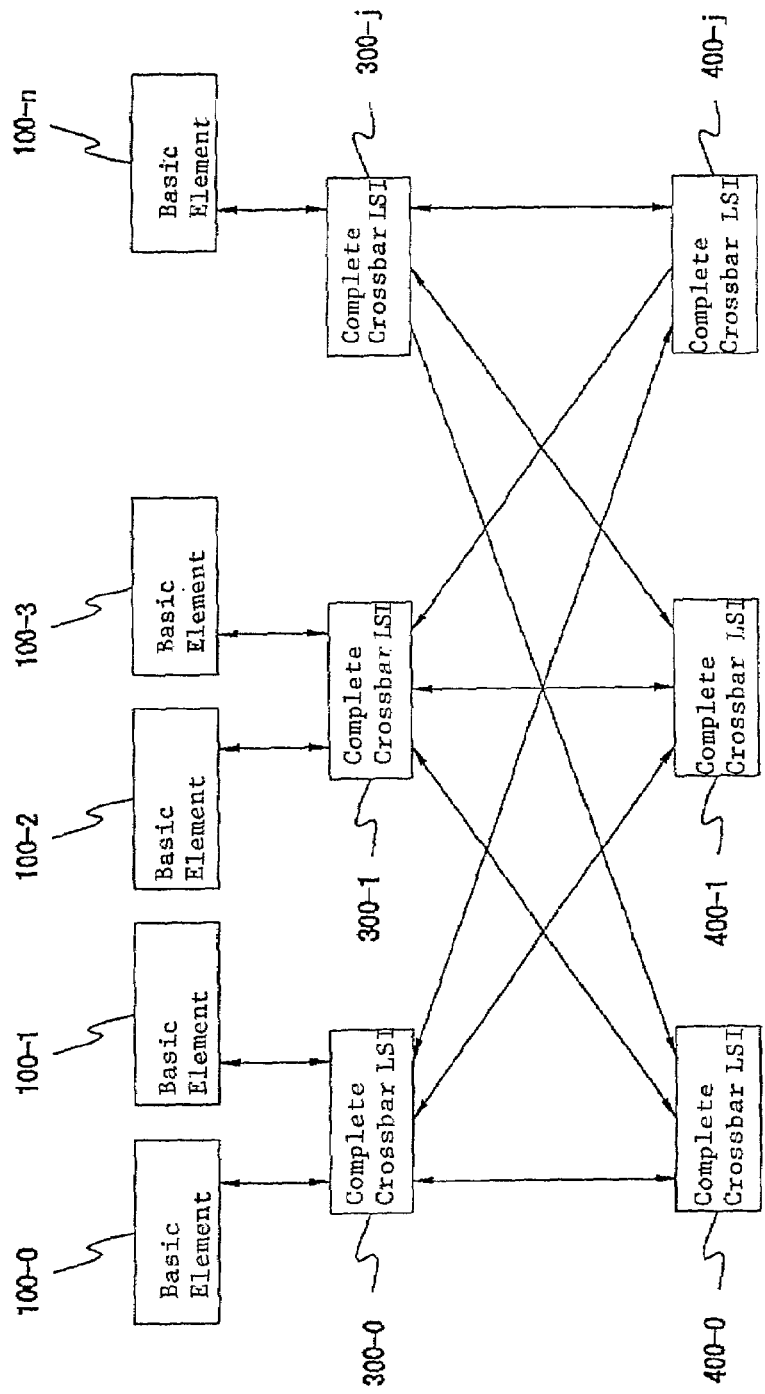
FIG. 3 shows the third prior-art network.
Figure 4:
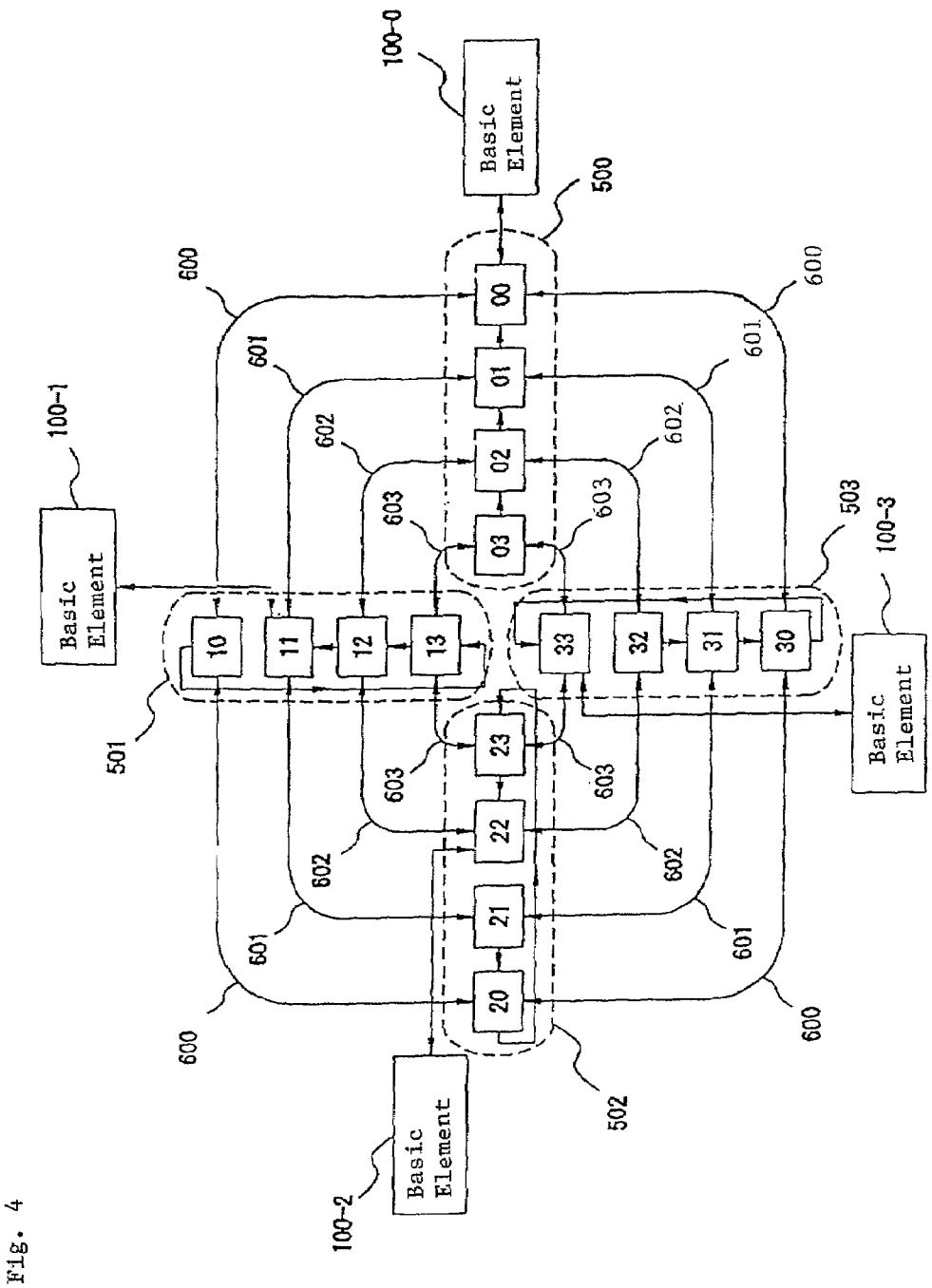
FIG. 4 shows a network of the first embodiment of the present invention.

Referring to FIG. 4, the network apparatus of the first embodiment of the present invention is first explained. FIG. 4 shows the network of the first embodiment that interconnects four basic elements.

As shown in FIG. 4, the network of this embodiment comprises: basic elements 100-0–100-3; switch device groups 500–503; and loop lines 600–603. Each switch device group is made up by four switch devices. Each of the basic elements of the four basic elements 100-0–100-3 is connected to switch device groups 500–503, which each have four switch devices, the number of switch devices being equal to the number of basic elements. Explanation next regards the connection between the basic elements and the switch device groups and also the connection inside the switch device groups.

Basic element 100-0 is bidirectionally and directly connected to switch device 00 in switch device group 500. As for the connections of each of the switch devices that make up switch device group 500, first, switch device 00 and switch device 01 are unidirectionally connected in the direction from switch device 01 toward switch device 00. Data therefore are transferred from switch device 01 to switch device 00. Next, switch device 01 and switch device 02 are unidirectionally connected in the direction from switch device 02 toward switch device 01. Switch device 02 and switch device 03 are unidirectionally connected in the direction from switch device 03 toward switch device 02. Accordingly, the flow of data between each of the switch devices within switch device group 500 is in one direction toward switch device 00, which is directly connected to the basic element.

Similarly, regarding the connection between basic element 100-1 and switch device group 501, switch device 11 is directly connected to basic element 100-1, followed by unidirectional connections from switch device 12 to switch device 11, from switch device 13 to switch device 12, and from switch device 10 to switch device 13. The connection between basic element 100-2 and switch device group 502 begins with direct and bidirectional connection between basic element 110-2 and switch device 22, followed by unidirectional connections from switch device 23 to switch device 22, from switch device 20 to switch device 23, from switch device 21 to switch device 20, and switch device 21. The connection between basic element 100-3 and switch device group 503 begins with direct and bidirectional connection between basic element 100-3 and switch device 33 followed by unidirectional connections from switch device 30 to switch device 33, from switch device 31 to switch device 30, and from switch device 32 to switch device 31. In all of the switch device groups, connection between the switch device directly connected to the basic element and that basic element is bidirectional, and connection between adjacent switch devices is unidirectional such that data are received in the direction toward the switch device that is directly connected to the basic element. If the outermost switch device is not the switch device that is directly connected to the basic element, the unidirectional connection is from the outermost switch device toward the innermost switch device. In the following description, the outermost switch device is referred to as "adjacent" to the innermost switch device.

Explanation next regards connection by loop lines.

Regarding connections by loop line 600, switch device 00, which is connected first (i.e., connected directly) to basic element 100-0 within switch device group 500, is bidirectionally connected to switch device 30, which is second in adjacency to basic element 100-3 within switch device group 503 (i.e., switch device 30 is connected to the basic element by way of the switch device that is directly connected to the basic element). Next, this switch device 30 is bidirectionally connected to switch device 20, which is third in adjacency to basic element 100-2 within adjacent switch device group 502 (i.e., switch device 20 is connected to the basic element by way of the switch devices that are first and second in adjacency to the basic element). Next, this switch device 20 is bidirectionally connected to switch device 10, which is the fourth in adjacency to basic element 100-1 within adjacent switch device group 501 (i.e., switch device 10 is connected to the basic element by way of the switch devices that are first, second, and third in adjacency to the basic element). Finally, this switch device 10 is bidirectionally connected to previously described switch device 00 within adjacent switch device group 500. As a result, the connected elements of loop line 600 include one each of ordered switch devices that are electrically connected in series within each of the switch device groups. The connections for loop line 601, loop line 602, and loop line 603 are similar, the connected elements of each loop line including one each of the ordered switch devices that are electrically connected in series within each switch device group.

Figure 5:
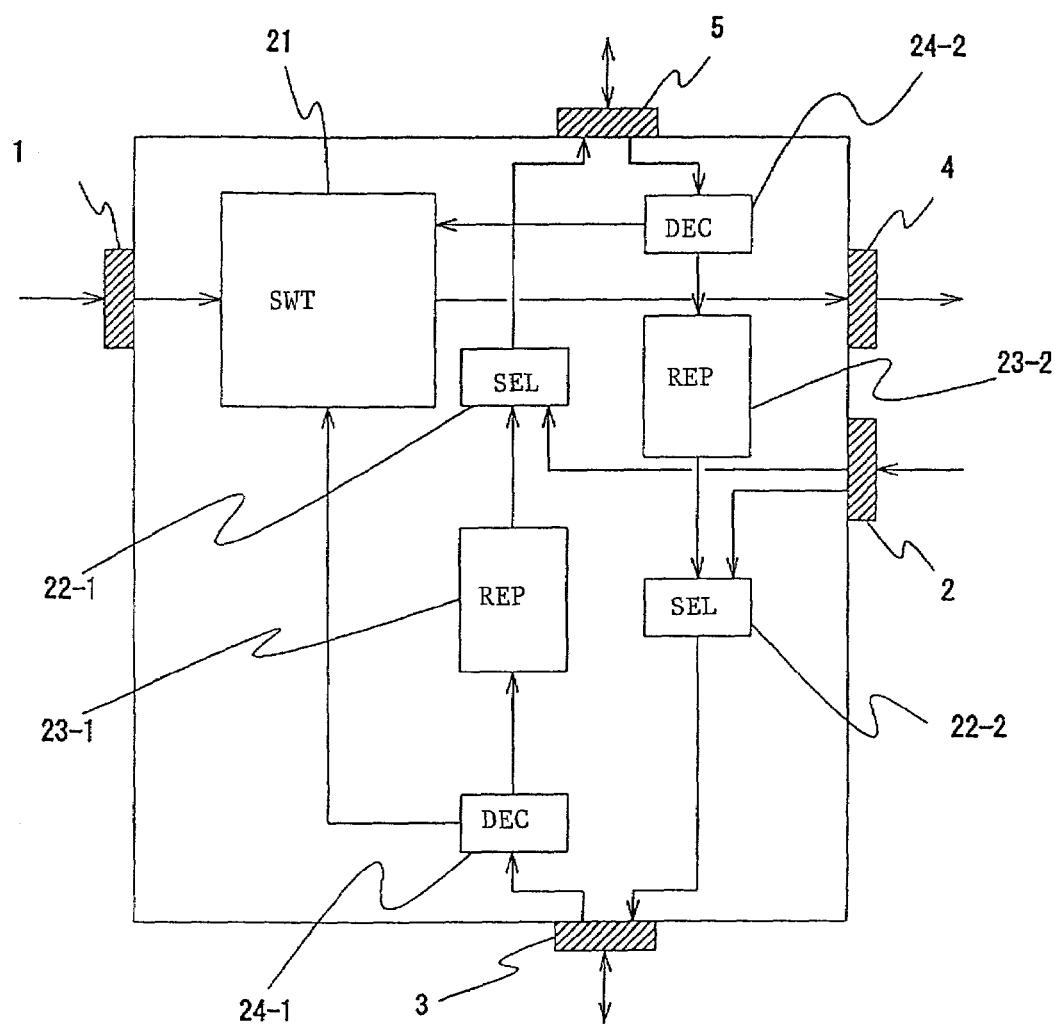
FIG. 5 shows a switch device of the network of the first embodiment.

Explanation next regards the configuration and operation of the switch devices that make up the switch device groups of the network of this embodiment with reference to FIG. 5. FIG. 5 is a block diagram showing the configuration of a switch device.

As shown in FIG. 5, the switch device has ports 1-5 and is made up by: switch 21, selector 22-1, selector 22-2, repeater 23-1, repeater 23-2, decoder 24-1, and decoder 24-2.

Port 3 and port 5 receive data attached with destination information (hereinbelow referred to as packets) from a switch device of an adjacent switch device group through the loop line. Port 3 and port 5, in addition, transmit packets to be sent to switch devices within adjacent switch device groups through the loop line.

Packets destined to the basic element connected to the switch device group that includes the switch device concerned are received at port 1 through another switch device within the switch device group concerned (within the same switch device group).

If this switch device is the switch device that is directly connected to the basic element, port 2 and port 4 are connected to the basic element. In such a case, packets addressed to the basic element are transmitted from port 4 to the basic element concerned. Packets issued from the basic element are received at port 2.

If this switch device is not directly connected to the basic element in connection with this switch device group, packets, received through port 3 or 5 destined to the basic element concerned, are transmitted to the unidirectionally connected adjacent switch device from port 4. In such a case, there is no input from port 2.

A packet that is received at port 3 is sent to decoder 24-1. Decoder 24-1 judges whether or not this packet is addressed to the basic element connected to this switch device group, and sends the packet to switch 21 if it is addressed to the basic element concerned. Decoder 24-1 also sends a received packet to switch 21 if the packet has been transmitted from the basic element concerned (i.e., if a packet has been returned without being transferred to any other basic element due to a breakdown of the network apparatus or inadequacy of the attached destination information). If it is judged in this decoder 24-1 that a packet is not addressed to the basic element concerned, decoder 24-1 sends the packet to repeater 23-1.

A packet received by repeater 23-1 is sent through selector 22-1 to port 5 and then transmitted to a switch device within an adjacent switch device group connected to port 5. Selector 22-1 always selects only packets that are received from port 2 and passes them to port 5 if the switch device concerned is directly connected to the basic element, and selects only packets that are received from this repeater 23-1 and passes them to port 5 if the switch device concerned is not directly connected to the basic element.

Packets that are received from port 5 are sent to decoder 24-2. Decoder 24-2 judges whether or not the packets are addressed to the basic element connected to the same switch device group, and sends the packets to switch 21 if the packet is addressed to the basic element connected to that switch device group. Decoder 24-2 also sends the packets to switch 21 if the received packets are transmitted from the basic element connected to that switch device group (i.e., if the received packets are such packets that have been returned without being transmitted to any other basic element due to a breakdown in the network apparatus or to the inadequacy of the attached destination information). In addition, packets are sent to repeater 23-2 if decoder 24-2 judges the packets as not being addressed to the basic element connected to this switch device group. Repeater 23-2 repeats the received packets to a switch device within an adjacent switch device group connected to port 3, whereupon the packets are sent through selector 22-2 to port 3. Selector 22-2 always selects only packets that have been received from port 2 and passes them to port 3 if the basic element is directly connected to the switch device concerned, and always selects only packets that are received from the repeater 23-2 and passes them to port 3 if the basic element is not directly connected to the switch device concerned.

Switch 21 selects one packet at a time from a packet that is received from decoder 24-1, a packet that is received from decoder 24-2, and a packet that is received from port 1. A buffer (FIFO) of prescribed size (not shown in the figure) is therefore provided for input queuing at the input of switch 21. Packets that have been dealt with by this switch 21 are sent out from port 4.

The preceding has been an explanation of the configuration and operation of the switch device that makes up the switch device group of the network of the first embodiment. When there is no local breakdown in the network (referred to hereinbelow as normal operation), communication can be performed by the flow of data through each loop line in only one direction and not in both directions. Thus, in a switch device the port 2 of which is connected to the basic element, packets that are received from port 2 are sent to one of the two selectors 22 during normal operation. In contrast, in the event of a breakdown at some locality of the network apparatus (hereinbelow referred to as an emergency), when the switch device concerned is directly connected to the basic element, packets that are received from port 2 are either sent to one of the two selectors 22 or sent to both selectors 22. For this reason, control from the outside (not shown in the figure) is exerted on the received packet to select a selector that is appropriate for the packet to reach the destination of the packets.

Figure 6:
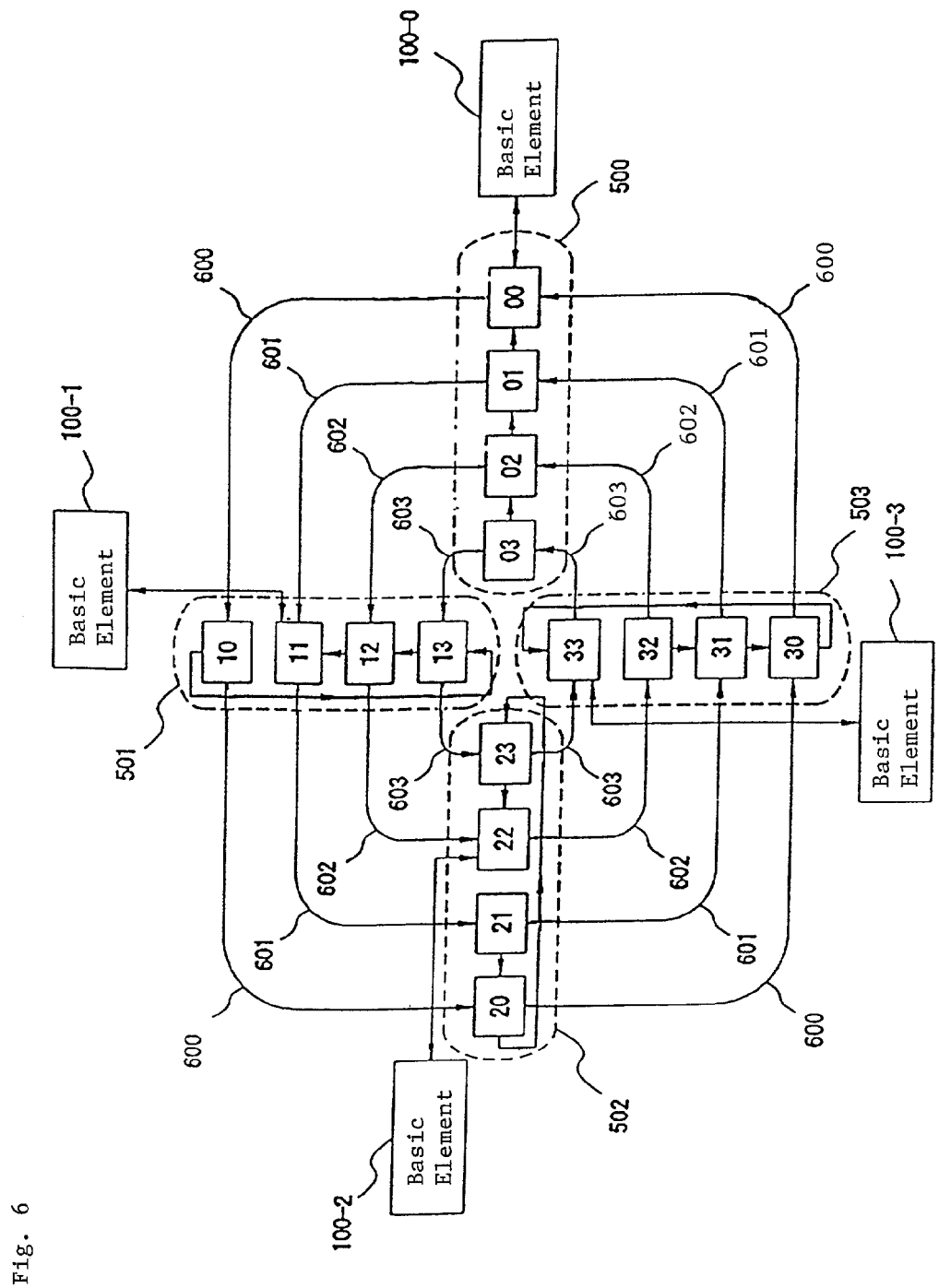
FIG. 6 is a view of a network showing communication under normal conditions in the first embodiment.
Figure 7:
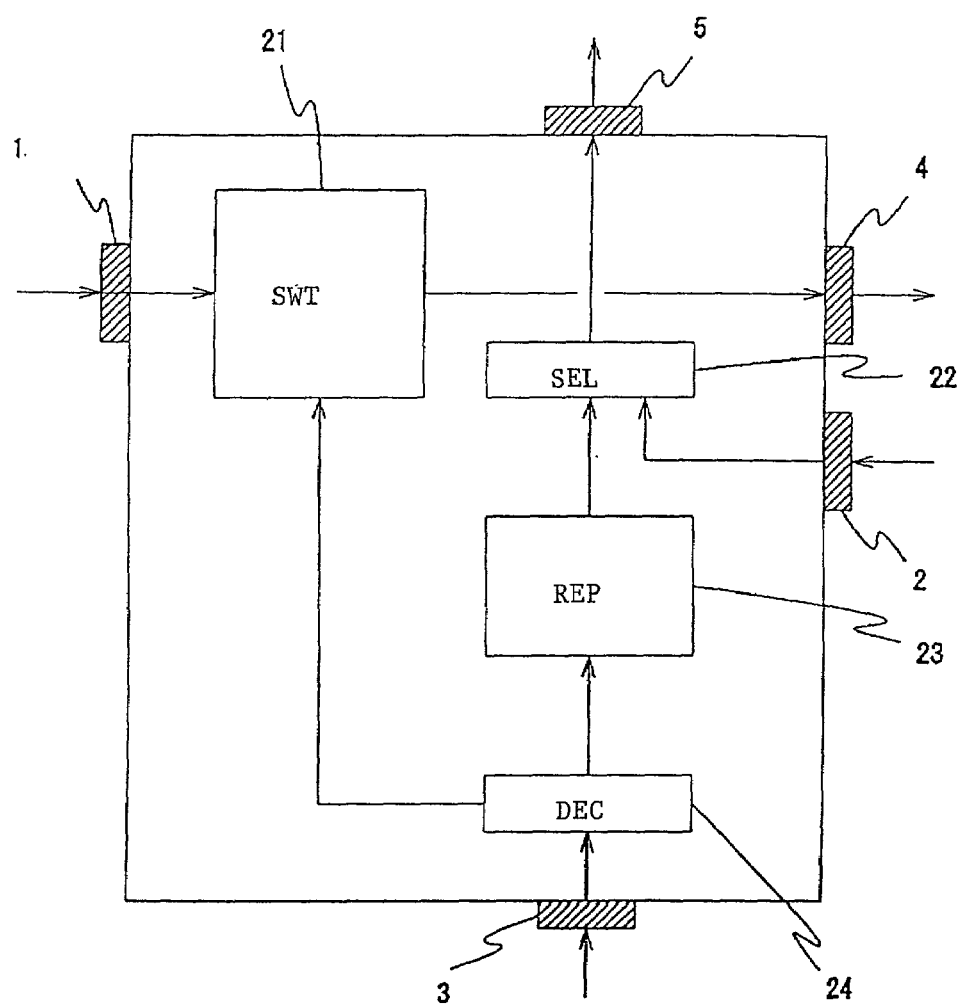
FIG. 7 shows the constituent elements that operate under normal conditions in the switch device of the network of the first embodiment.

Explanation is next presented regarding communication during normal operation of the network of the first embodiment with reference to FIGS. 6 and 7.

FIG. 6 is a network diagram showing communication during normal operation of the first embodiment in which four basic elements are connected. FIG. 7 shows only the constituent elements that operate during normal operation of a switch device in the network of the first embodiment. As shown in FIG. 6, packets that flow over each loop line move in only one direction (in FIG. 6, counterclockwise) during normal operation. Constituent elements of the switch device that operate during normal operation are therefore limited to the elements shown in FIG. 7.

As shown in FIG. 7, a switch device during normal operation is abbreviated in comparison with the constituent elements shown in FIG. 5 because only one of the two decoders 24, one of the two repeaters 23, and one of the two selectors 22 operate. A case is next described using FIG. 6 in which basic element 100-3 transfers data to basic element 100-1 as an example of actual communication.

Packets sent from basic element 100-3 are received at switch device 33 within switch device group 503 that is directly connected to basic element concerned 100-3. In switch device 33, selector 22 always selects input from port 2. These packets are therefore transmitted to switch device 03 in switch device group 500 by way of loop line 603. At switch device 03, the received packets are received from port 3, and decoder 24 judges whether or not the packets are addressed to the basic element that is in connection with switch device group 500. Since the packets in this case are not addressed to basic element 100-0 connected to switch device group 500, repeater 23 repeats the packets to switch device 13 in adjacent switch device group 501.

In switch device 13 as well, decoder 24 judges whether or not the received packets are addressed to the basic element connected to that switch device group 501. In this case, the destination information attached to the packets indicates basic element 100-1, and decoder 24 therefore judges that the packets are communication for basic element 100-1 connected to that switch device group 501. The packets are then transmitted by switch 21 to switch device 12 in the same switch device group 501. In switch device 12, selection is then performed using switch 21 between packets that have been transmitted from another basic element by way of loop line 602 and the packets that have been delivered from that switch device 13 by way of port 1. In a case in which packets that have been transferred from switch device 13 are selected, the packets are further transferred to switch device 11 in the same switch device group 501 by way of port 4. Switch device 11 is the switch device that is directly connected to basic element 100-1, and the received packets are therefore transferred to basic element 100-1 by way of port 4, thereby completing the transmission of packets from basic element 100-3 to basic element 100-1.

Figure 8:
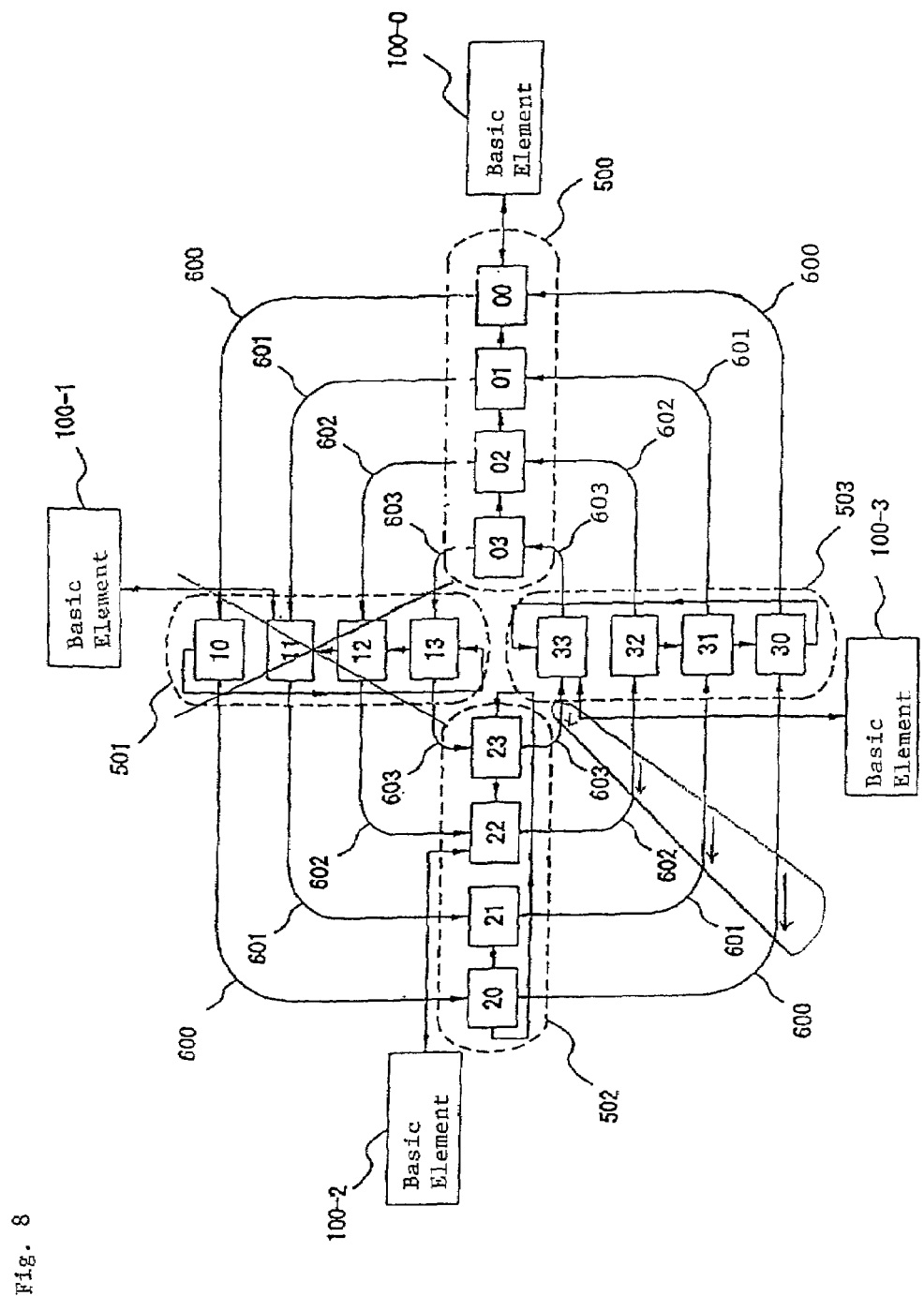
FIG. 8 shows the constituent elements that operate during an emergency in the switch device of the network of the first embodiment.

The preceding explanation regards the communication in the network of the first embodiment during normal operation. In the event of a breakdown in some locality of the network, the flow of data is stopped from passing through a switch device group with the failed device included as a constituent element. Data communication in the direction on the loop line that was not used during normal operation is used in this case. An explanation is next given with reference to FIG. 8 regarding operation during an emergency in the network of the first embodiment. FIG. 8 is a network diagram showing communication during an emergency in the first embodiment in which four basic elements are connected.

As shown in FIG. 8, the event of a breakdown in switch device group 501 prevents, for example, communication from basic element 100-3 to basic element 100-2 by means of the counterclockwise unidirectional loop line that has been originally operating. In this case, the loop line is used such that packets are transmitted in the same direction (counterclockwise direction) as before (during normal operation) for communication from basic element 100-3 to basic element 100-0, and communication to switch device groups other than switch device group 501, for example, communication from basic element 100-3 to basic element 100-2, can be continued without being affected by the breakdown of switch device group 501 by transmitting packets in the reverse direction (clockwise direction) on the loop line.

In this case, switch device 33 of FIG. 8 transfers packets in both directions on the loop line. In other words, switch device 33 transfers the packets in a counterclockwise direction on loop line 603 when packets received from basic element 100-3, directly connected to switch device 33 concerned, are addressed to basic element 100-0, and transfers the packets in a clockwise direction on loop line 603 when the packets are addressed to basic element 100-2.

The preceding explanation regards communication during an emergency on the network of the first embodiment of the present invention.

Explanation next regards the method of increasing basic elements for the network of the first embodiment. As a working example, explanation is presented using FIGS. 9 and 10 regarding a case in which one basic element is added to produce a network in which five basic elements are connected from a network in which four basic elements are connected.

Figure 9:
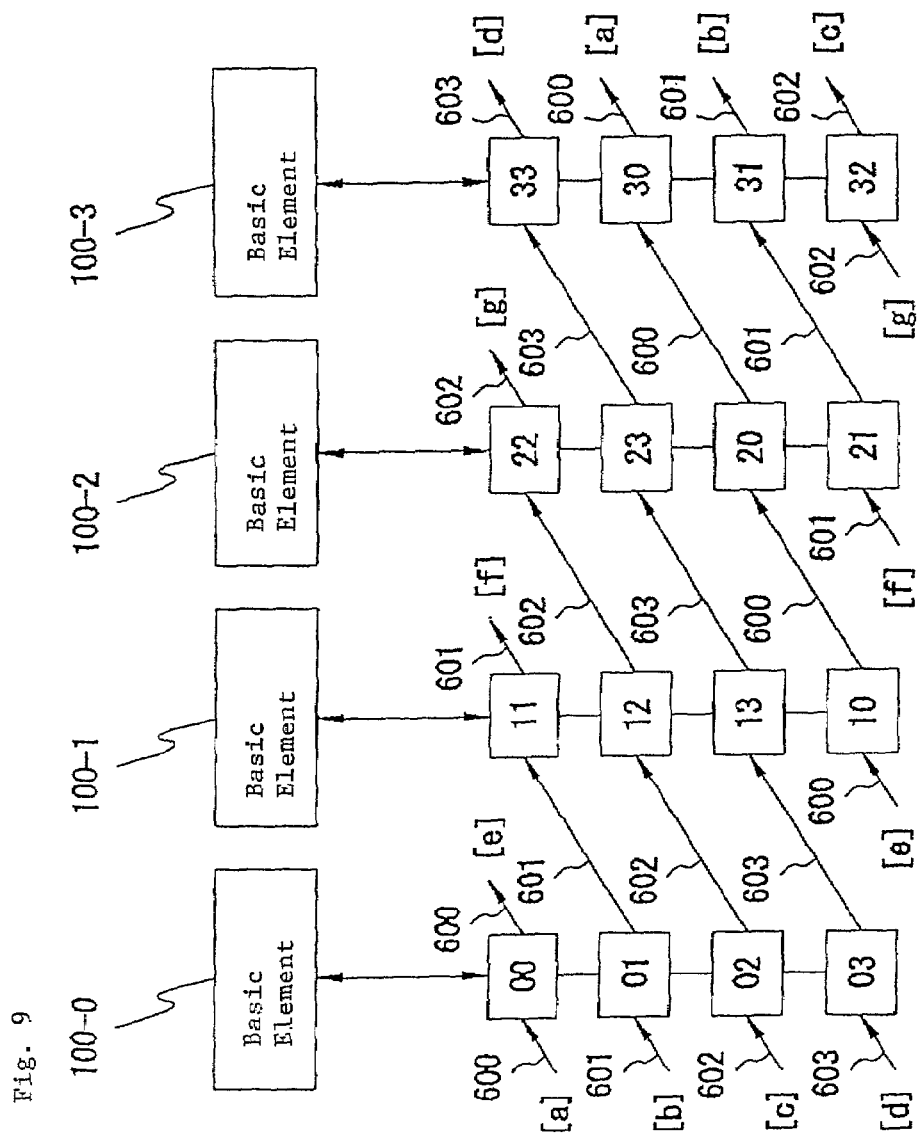
FIG. 9 shows an alternative expression of a network of the first embodiment in which four basic elements are connected.
Figure 10:
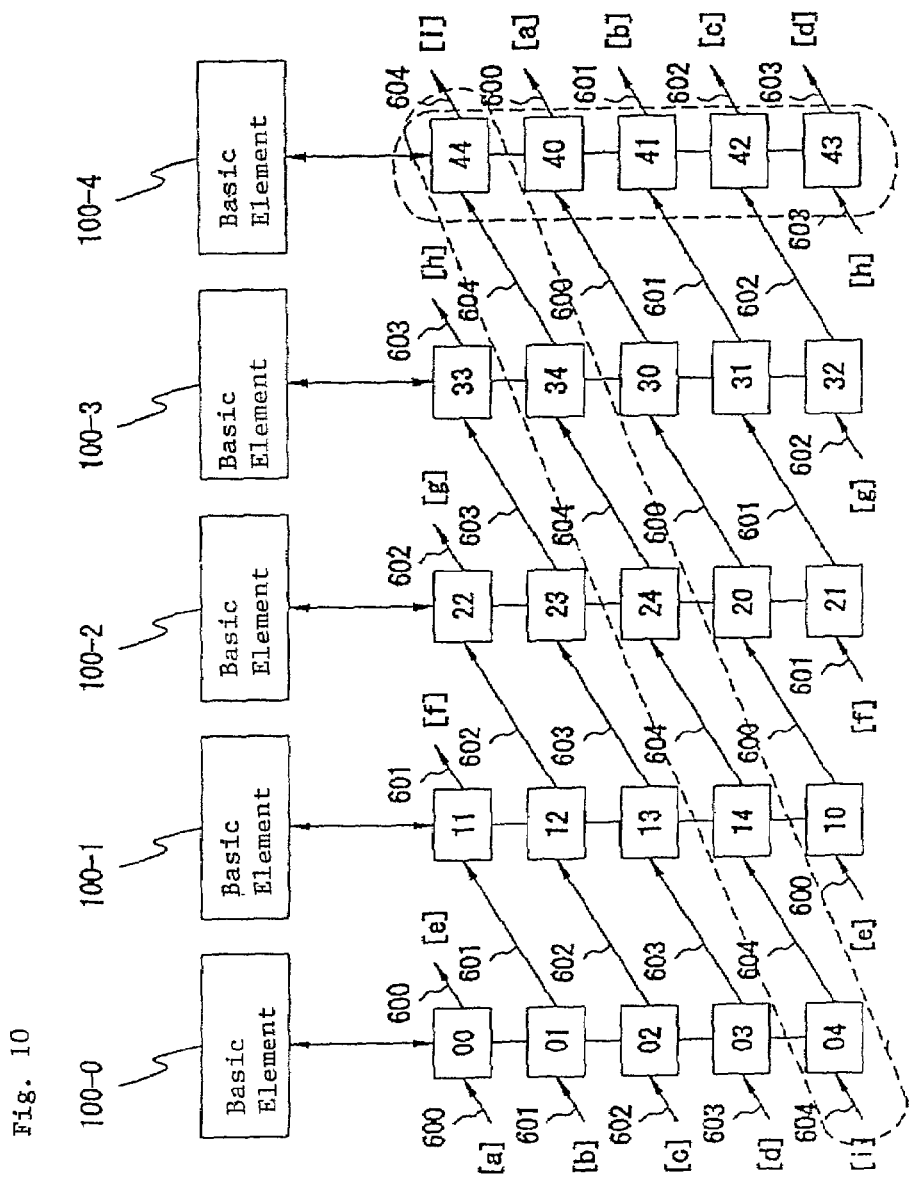
FIG. 10 shows a network of the first embodiment in a case in which one basic element has been added to increase four basic elements to five basic elements.

FIG. 9 shows a network of the first embodiment in which four basic elements are connected and in which the direction of data flow is in a counterclockwise direction. Although the network constituent elements and direction of data flow in FIG. 9 are the same as in FIG. 6, the mode of representation in the figure is different: the switch devices in each switch device group directly connected to the basic elements are aligned in the highest row. FIG. 10 shows connections for a case in which basic element (100-4) is newly added to the configuration of FIG. 9.

FIG. 10 is a network diagram showing connections for a case in which one basic element has been added to produce a network in which five basic elements are connected, from a network in which four basic elements are connected. As shown in FIG. 10, the addition of basic element (100-4) adds the switch device group and switch devices that are enclosed by the dotted lines. In this network as well, the connections, regarded as necessary, after the addition of basic element (100-4) are only between adjacent switch device groups.

When basic elements are repeatedly added, moreover, the necessary connections are only between adjacent switch device groups, and a large-scale system can therefore be configured without an upper limit while keeping the connection cable length substantially unchanged.

Figure 11:
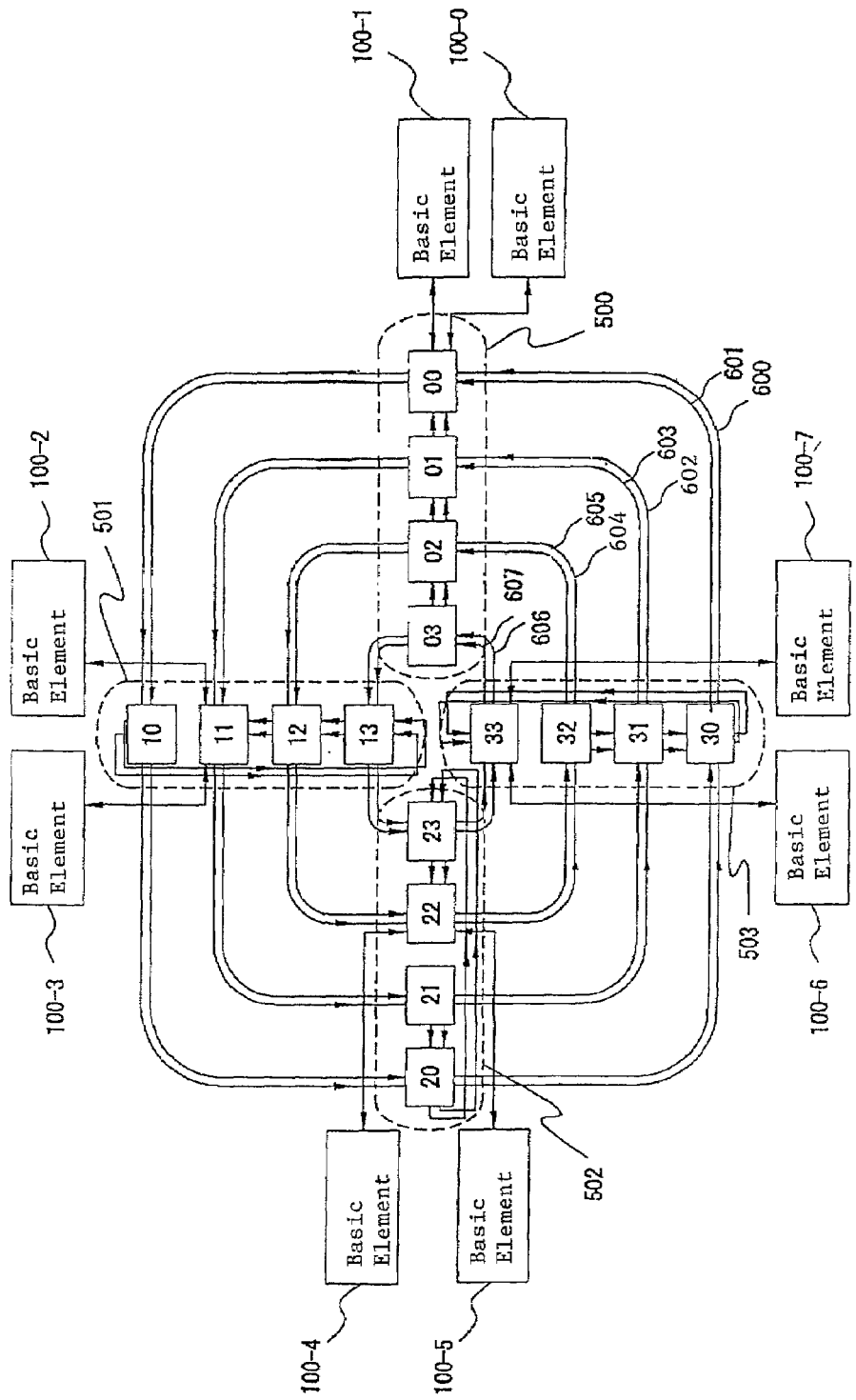
FIG. 11 shows the network of the second embodiment of the present invention.
Figure 12:
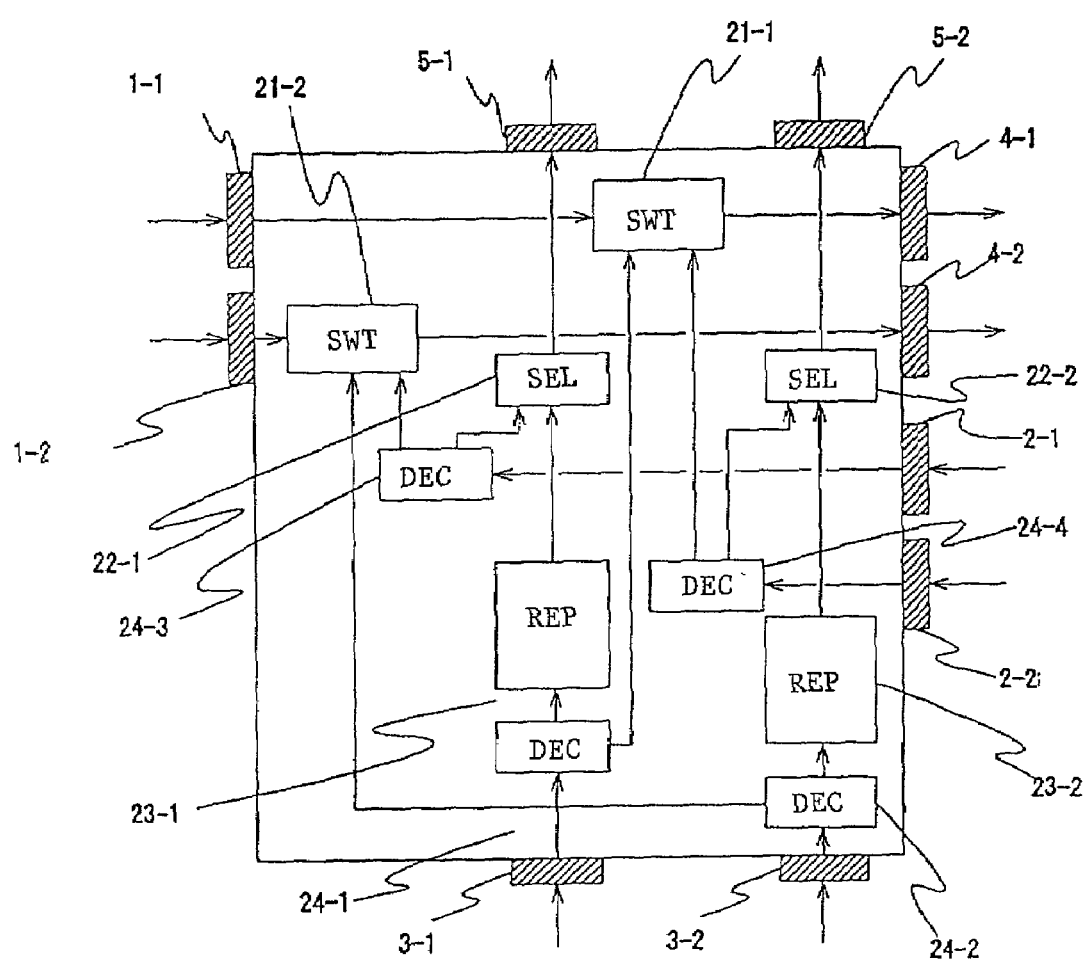
FIG. 12 shows a switch device of the network of the second embodiment.

Referring now to FIGS. 11 and 12, the network apparatus of the second embodiment of the present invention is described.

FIG. 11 shows a network in which eight basic elements are connected, and moreover, shows communication during normal operation. As shown in FIG. 11, the network of this embodiment is made up by basic elements (100-0)–(100-7), switch device groups 500–503, and loop lines 600–607; each switch device group being made up by four switch devices.

In this network, two basic elements are connected to one switch device, and moreover, two loop lines are connected to one switch device, whereby communication is realized in two basic elements by way of two different loop lines. For communication between two basic elements that are connected to the same switch device, however, communication is performed by way of the switch device rather than by using the loop line, and the constituent elements of the switch devices in the network of this embodiment are therefore different from the switch devices in the network of the first embodiment.

FIG. 12 is a structural diagram of a switch device of this embodiment.

A switch device of this embodiment includes ports 1—1, 1-2, ports 2-1,2—2, ports 3-1,3-2, ports 4-1,4-2, and ports 5-1,5-2; and moreover, is provided with the following constituent elements that operate during normal operation: switches 21-1,21-2, selectors 22-1,22-2, repeaters 23-1,23-2, and decoders 24-1,24-4. The arrows in the figure indicate the flow of signals during normal operation.

The switch device shown in FIG. 12 is made up by a combination of two basic switch devices. Each basic switch device has a configuration in which one decoder is added to the switch device shown in FIG. 7. The two combined basic switch devices are packaged on one LSI. By means of this construction, the two basic switch devices perform basic functions independently.

Specifically, in a case in which a switch device is the switch device that is directly connected to two basic elements, one of the two basic elements (hereinbelow referred to as basic element 1) is connected to port 4-1 and port 2-1, and the other basic element (hereinbelow referred to as basic element 2) is connected to port 4-2 and port 2—2. The constituent elements that operate during communication transmitted by basic element 1 are switch 21-1, selector 22-1, repeater 23-1, decoder 24-1, and decoder 24-3; the loop line that is employed is the loop line connected to port 5-1 and port 3-1; and the adjacent switch device within the same switch device group is connected to port 1—1.

In contrast, the constituent elements that operate during communication transmitted by basic element 2 are switch 21-2, selector 22-2, repeater 23-2, decoder 24-2, and decoder 24-4; the loop line that is employed is the loop line that is connected to port 5-2 and port 3-2; and the adjacent switch device of the same switch device group is connected to port 1-2.

Communication between basic elements connected to the same switch device is not performed via the loop line. In concrete terms, in a case in which packets are transferred from basic element 1 to basic element 2, packets that are received from port 2-1 are judged by decoder 23-3 to be either packets for basic element 2 or packets for another basic element of the network. If the packets are for basic element 2, they are sent to switch 21-2 and then delivered from this switch 21-2 to basic element 2 through port 4-2. If the packets are destined for a basic element coupled with another switch device groupe on the network, the packets are then sent to selector 22-1

The preceding explanation regards the configuration and operation of a switch device of the second embodiment. In a case in which a plurality of basic elements and loop lines of the same number are connected to one switch device in this way, complete crossbar connection can be achieved because an exclusive loop line exists for each basic element. Furthermore, in this embodiment as in the previously described first embodiment, a network can be constructed by connecting only adjacent switch device groups, and as a result, a large-scale network can be constructed without limitations by using cables of substantially uniform length and moreover, by combining switch devices having identical structure.

Figure 13:
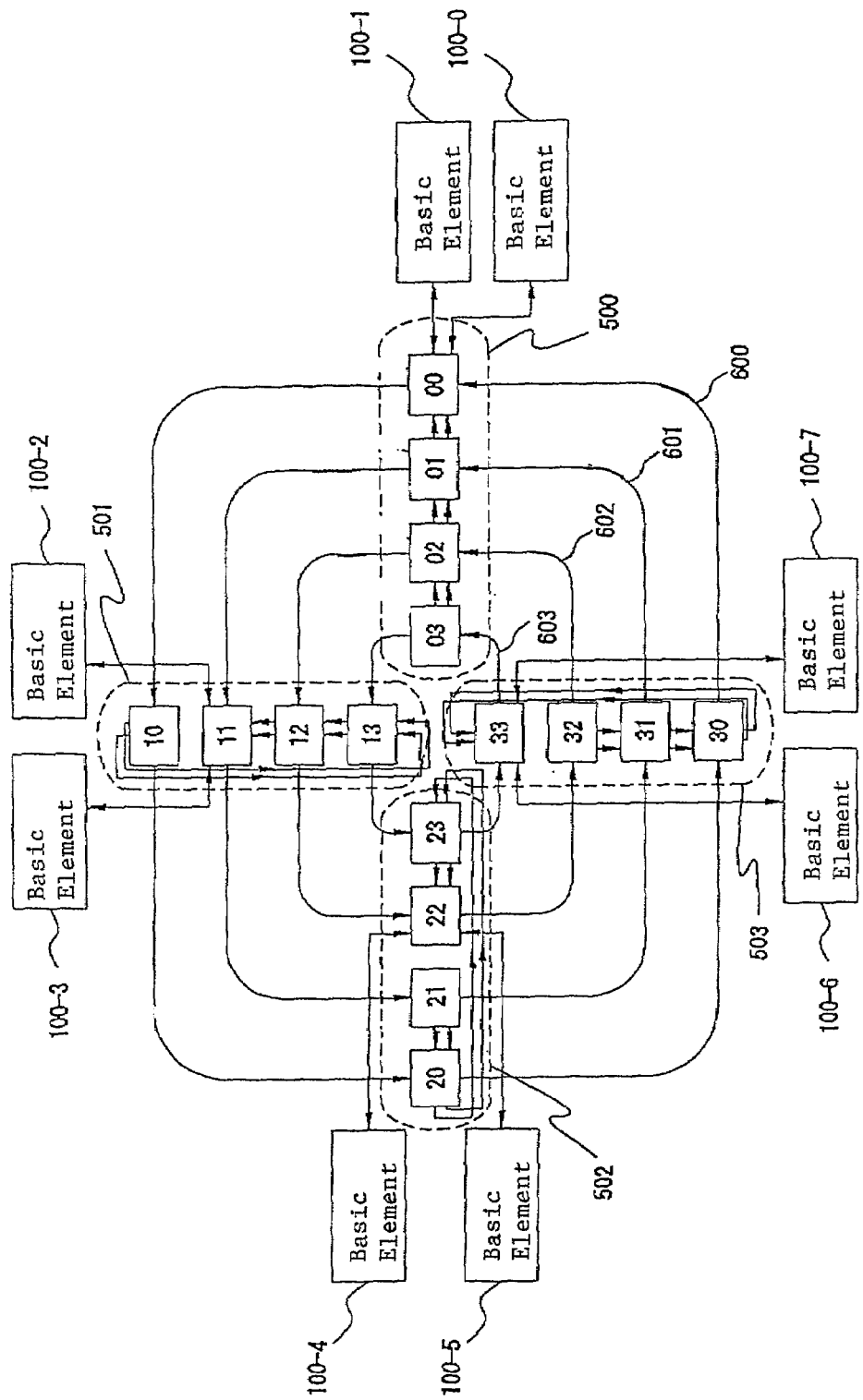
FIG. 13 shows the network of the third embodiment of the present invention.
Figure 14:
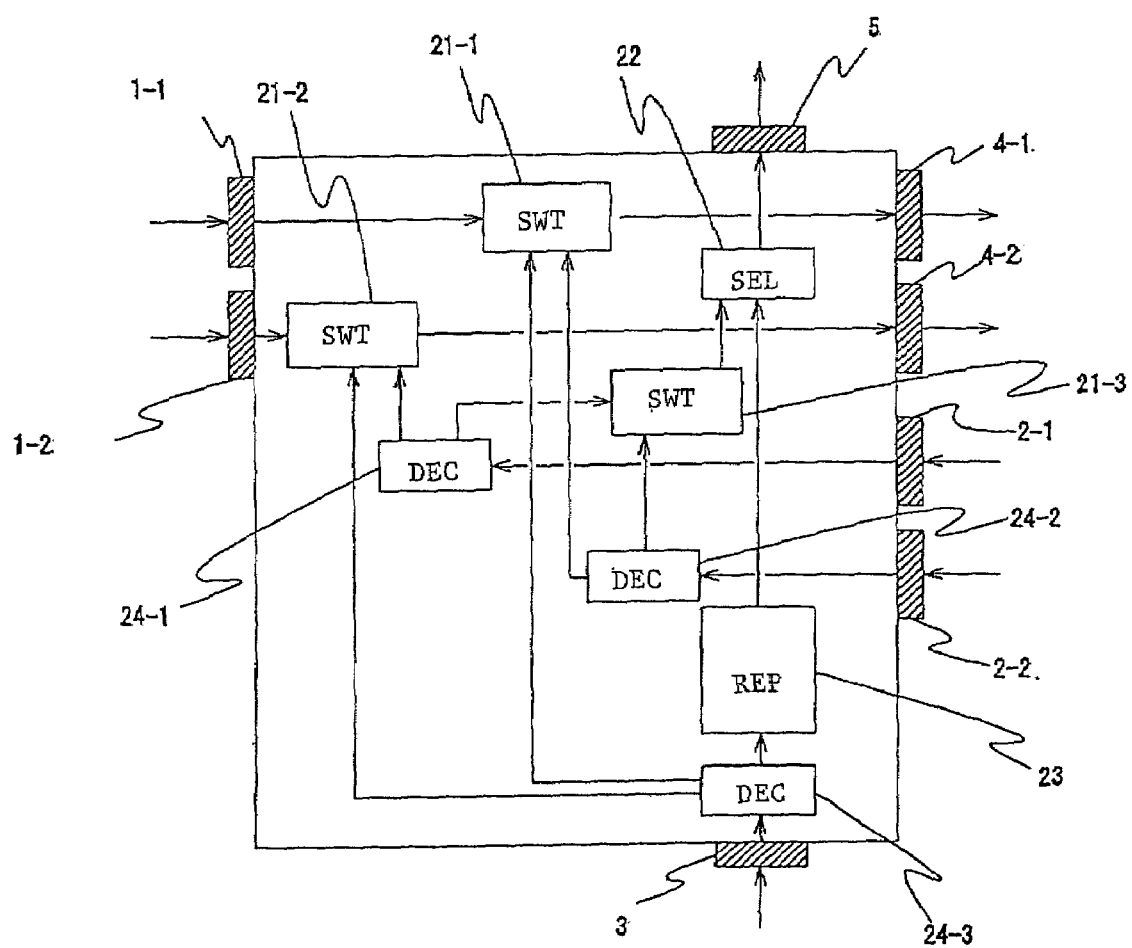
FIG. 14 shows the switch device of the network of the third embodiment.

Referring now to FIGS. 13 and 14, the network of the third embodiment of the present invention is next explained.

FIG. 13 shows a network of the third embodiment of the present invention in which eight basic elements are connected. The figure shows communication during normal operation. The network of this embodiment is made up by: basic elements 100-0–100-7; switch device groups 500–503; and loop lines 600–603; each switch device group being provided with four switch devices.

The network of the third embodiment is the same as the second embodiment in that two basic elements are connected to one switch device group. However, only one loop line exists between each of the switch devices in differing switch device groups and one loop line is shared by two basic elements. For example, basic element 100-0 and basic element 100-1 both communicate with other basic elements via a single loop line 600. Switch devices of the network of the third embodiment therefore have different constituent elements from the switch devices of the networks of the first and second embodiments. Switch devices of the third embodiment are next explained with reference to FIG. 14.

FIG. 14 shows the construction of a switch device of the network of the third embodiment of the present invention. The figure shows normal operation.

The switch device includes ports 1—1, 1-2, ports 2-1, 2—2, port 3, ports 4-1, 4-2, and port 5; as well as switches 21-1, 21-2, selector 22, repeater 23, and decoders 24-1, 24-2.

The switch device shown in FIG. 14 adopts a configuration that, compared with the constituent elements of the switch device shown in FIG. 12, has one less constituent element for the sequence of operations: port→decoder→repeater→selector→port to repeat packets that have been received from one switch device of the loop line to a switch device that is on that loop line. As a result, a packet received from the two basic elements connected to the same switch device is transferred via the same loop line.

Specifically, when a switch device is the switch device that is directly connected to the two basic elements, the first basic element of the two basic elements is connected to port 4-1 and port 2-1, and the second basic element is connected to port 4-2 and port 2—2. Decoder 24-1 judges whether or not packets that are sent from the first basic element are addressed to the second basic element, and sends the packets to switch 21-2 in case that the packets are addressed to the second basic element, or sends the packets to switch 21-3 in case that they are not.

Similarly, decoder 24-2 judges whether or not packets received from the second basic element are addressed to the first basic element, and sends the packets to switch 21-1 in case that they are addressed to the first basic element, or sends them to switch 21-3 in case that they are not.

Switch 21-3 selects packets from the two basic elements (such that two packets are not sent simultaneously) and sends the packets to selector 22. In the case that the switch device is directly connected to the basic elements, selector 22 selects packets that have been received from switch 21-3. In the case that the switch device is not directly connected to the basic elements, selector 22 selects packets received from repeater 23. Selector 22 delivers the packets to port 5.

Thus, in a case in which two basic elements share a single loop line, a first-round switching process is carried out when packets are received from a basic element, and further, a second-round switching process is carried out for transferring the packets to one of the basic elements when packets have arrived at the destination switch device group, whereby the characteristics of a multistage crossbar network different from the embodiments described so far are exhibited.

In the case of this embodiment, communication carried out between distinct basic elements through the common use of a single loop line can result in contention regarding the use of the one loop line. For this reason, the network of this embodiment is not included in a complete crossbar network. However, regarding the necessary connection between switch device groups, the network of this embodiment, as with the other embodiments, has the feature of enabling a large-scale network without a limits through connections only between adjacent switch device groups and only by increasing the number of switch devices that are combined as switch device groups. In addition, through the use of shared loop lines, the network of this embodiment reduces the number of employed cables by half and is far superior to the other examples in terms of construction costs.

Effects of the present invention are summarized as follows:

the first effect attainable by the present invention is the ability to easily realize both a small-scale complete crossbar network structure and large-scale complete crossbar network structure that previously could not be realized by a single crossbar LSI, by providing relatively small-scale switch devices and combining these switch devices;

in addition, since connections need only be established between adjacent nodes regardless of the network scale, a network structure can be made large scale without being subject to limitations imposed by the length of connection cables; and in contrast to a single-crossbar LSI of the prior art in which a single breakdown was very likely to have repercussions for the entire network, the adoption of a loop configuration by means of dispersed switch devices as in the present invention both realizes complete crossbar connection and easily provides a substitute path that avoids the locality of a breakdown, and therefore can prevent a single breakdown from adversely affecting the entire network.

While preferred embodiments of the present invention have been described using specific terms, such description is for illustrative purposes only, and it is to be understood that changes and variations may be made without departing from the spirit or scope of the following claims.

What is claimed is:

1. A network apparatus that interconnects two or more (=N) basic elements each having the capability to function as one computer, comprising:

N switch device groups that each has N switch devices, each of said N switch device groups being electrically configured such that only one of said N switch devices therein is directly connected to one of said basic elements without selecting the same basic element twice, and first to Nth of the N switch devices are connected in series in the order that a first switch device is connected directly to a basic element, a second switch device is connected to said first switch device, a third switch device is connected to said second switch device and so on up to a final Nth switch device, said Nth switch device being connected to a (N-1)th switch device, and N loop lines, each being connected to said N switch device groups, wherein each of said N loop lines is directly connected to only one of said N switch devices that is directly connected to one of said basic elements.

2. A network apparatus according to claim 1 wherein, if a number n (where $1 \leq n \leq N$) denotes an nth switch device, said loop line connects a switch device of each switch device group in a loop such that the switch device numbers increase one by one with progression around the loop line in either a clockwise or counter-clockwise direction and such that the switch device of switch device number N is connected to the switch device of switch device number 1.

3. A network apparatus according to claim 2 wherein said one of said basic elements and said first switch device, i.e., switch device 1 are bidirectionally connected for input and output of data.

4. A network apparatus according to claim 3 wherein each of the switch devices that constitute said switch device group is unidirectionally connected for one-way transfer of data toward said first switch device.

5. A network apparatus according to claim 4 wherein connections between each of the switch devices that make up said loop lines are bidirectional connections for data transfer.

6. A network apparatus that interconnects two or more (=N) basic elements each having the capability to function as one computer, comprising:

N switch device groups each having N switch devices, each of said N switch device groups being electrically configured such that one of said N switch devices is connected to one of said basic elements without selecting the same basic element twice and first to Nth switch devices are connected in series in the order that a first switch device is connected directly to a basic element, a second switch device is connected to said first switch device, a third switch device is connected to said second switch device and so on up to a final Nth switch device, said Nth switch device being connected to a (N-1)th switch device, and N loop lines, each being configured by connecting one switch device in each of N switch device groups in a loop without selecting the same device twice, wherein each of the switch devices that constitute each switch device group comprises:

a first port exclusively for receiving data attached with destination information received from an adjacent switch device in the same switch device group;

a second port exclusively for receiving data attached with destination information received from a basic element only when said switch device is directly connected to that basic element;

a third port and a fifth port for both input and output connected to said loop line;

a first and second decoder for judging whether data attached with destination information received from said third port or fifth port, respectively, are communication addressed to a basic element connected to the switch device group concerned or communication addressed to a basic element connected to another switch device group;

a switch unit for, in a case in which it is judged by said first or second decoders that data attached with destination information are addressed to said basic element connected to the switch device group concerned, selecting either that data addressed to the basic element concerned or data attached with destination information that have been received from said first port;

first and second repeaters for, in a case in which it is judged by said first and second decoders, respectively, that data attached with destination information are not addressed to said basic element connected to the switch device group concerned, repeating that data attached with destination information;

first and second selectors for selecting one of: data attached with destination information that have been received from said first and second repeaters and data attached with destination information that are received from said second port, to send the selected data to said fifth port or third port, respectively; and a fourth port exclusively for delivering data attached with destination information selected by said switch unit to a switch device adjacent in the direction of the basic element in the switch device group concerned or to the basic element.

7. A network apparatus according to claim 6 wherein first and second selectors of the switch device directly connected to said basic element make a fixed selection of only data attached with destination information that are received from said second port.

8. A network apparatus according to claim 6 wherein first and second selectors of the switch device connected to an adjacent switch device in the same switch device group by way of said fourth port make a fixed selection of only data attached with destination information that have been sent from said first and second repeaters, respectively.

9. A network apparatus that interconnects two or more pairs (=N pairs) of basic elements, each basic element having the capability to function as one computer, comprising:

N switch device groups that each has N switch devices, each of said N switch device groups being electrically configured such that only one of said N switch devices therein is directly connected to one pair of said basic elements without selecting the same basic element twice, and first to Nth switch devices are connected in series in the order that a first switch device is connected directly to a basic element, a second switch device is connected to said first switch device, a third switch device is connected to said second switch device and so on up to a final Nth switch device, said Nth switch device being connected to a (N-1)th switch device, and N loop transmission paths, each being connected to said N switch device groups, wherein each of said N loop transmission paths is directly connected to only one of said N switch devices that is directly connected to one said pair of said basic elements.

10. A network apparatus according to claim 9 wherein, if a number n (where $1 \leq n \leq N$) denotes an nth switch device, said loop transmission path connects a switch device of each switch device group in a loop such that the switch device numbers increase one by one with progression around the loop transmission path in either a clockwise or counter-clockwise direction and such that the switch device of switch device number N is connected to the switch device of switch device number 1; said one pair of said basic elements and said first switch device, i.e., switch device 1 are bidirectionlly connected for input and output of data; and each of the switch devices that constitute said switch device group is unidirectionally connected for one-way transfer of data toward said first switch device.

11. A network apparatus that interconnects two or more pairs (=N pairs) of basic elements, each basic element having the capability to function as one computer, comprising:

N switch device groups each having N switch devices, each of said N switch device groups being electrically configured such that: one of said N switch devices is connected to one pair of said basic elements without selecting the same basic element twice; and first to Nth switch devices are connected in series in the order that a first switch device is connected directly to a basic element, a second switch device is connected to said first switch device, a third switch device is connected to said second switch device and so on up to a final Nth switch device, said Nth switch device being connected to a (N-1)th switch device, and N loop transmission paths, each being configured by connecting one switch device in each of N switch device groups in a loop without selecting the same device twice, wherein each of said N loop transmission paths is composed of two loop lines, whereby the two basic elements connected to the same switch device group communicate with basic elements connected to other switch device groups through different loop lines of the same loop transmission path.

12. A network apparatus according to claim 11 wherein each switch device comprises a first and second basic switch circuit, and each of the basic switch circuits comprises:

a first port exclusively for receiving data attached with destination information that are sent from an adjacent switch device in the same switch device group;

a second port exclusively for receiving data attached with destination information that are sent from a first or a second basic element of said pair of basic elements only if that switch device is directly connected to said pair of basic elements;

a third port and a fifth port that are connected to said loop transmission path;

a first decoder for judging whether data attached with destination information that have been received from said third port are communication addressed to a basic element that is connected to the switch device group concerned or communication addressed to a basic element that is connected to another switch device group;

a switch unit;

a fourth port for supplying the output of said switch unit to a basic element that is connected to the switch device group concerned; and a repeater for, in a case in which it is judged by said first decoder that data attached with destination information are communication addressed to a basic element that is connected to said other switch device group, repeating that data attached with destination information;

said first and second basic switch circuits each further including a selector and a second decoder; wherein:

the second decoder of the first basic switch circuit receives, by way of the second port, data attached with destination information from the first basic element that is connected to the second port of the first basic switch circuit and judges whether the data attached with destination information are communication addressed to the second basic element or communication addressed to the basic element that is connected to another switch device group by way of a loop line;

the second decoder of the second basic switch circuit receives, by way of the second port, data attached with destination information from the second basic element that is connected to the second port of the second basic switch circuit and judges whether the data attached with destination information is communication addressed to the first basic element or communication addressed to the basic element that is connected another switch device group by way of a loop line;

the switch unit of the first basic switch circuit receives:

data attached with destination information that have been received from the first port of the first basic switch circuit; data attached with destination information that have been received from the third port of the first basic switch circuit when the first decoder of the first basic switch circuit judges that these data attached with destination information are addressed to the first basic element; and data attached with destination information that have been received from the second port of the second basic switch circuit when the second decoder of the second basic switch circuit judges that these data attached with destination information are communication addressed to the first basic element; and selects any of these data attached with destination information, and supplies the selected data to the fourth port of the first basic switch circuit;

the switch unit of the second basic switch circuit receives:

data attached with destination information that have been received from the first port of the second basic switch circuit; data attached with destination information that have been received from the third port of the second basic switch circuit when the first decoder of the second basic switch circuit judges that these data attached with destination information are addressed to second basic element; and data attached with destination information that have been received from the second port of the first basic switch circuit when the second decoder of the first basic switch circuit judges that these data attached with destination information are communication addressed to the second basic element; and selects any of these data attached with destination information, and supplies the selected data to the fourth port of the second basic switch circuit;

the selector of the first basic switch circuit selects one of:

data attached with destination information that have been received from the second port of the first basic switch circuit when the second decoder of the first basic switch circuit judges that these data attached with destination information are communication addressed to the basic element connected to another switch device group; and output of the repeater of the first basic switch circuit; and supplies the selected data to the fifth port of the first basic switch circuit; and the selector of the second basic switch circuit selects one of:

data attached with destination information that have been received from the second port of the second basic switch circuit when the second decoder of the second basic switch circuit judges that these data attached with destination information are communication addressed to the basic element connected to another switch device group; and output of the repeater of the second basic switch circuit;

and supplies the selected data to the fifth port of the second basic switch circuit.

13. A network apparatus according to claim 10 wherein each loop transmission path of said N loop transmission paths is composed of one loop line, and two basic elements that are connected to the same switch device group communicate with a basic element connected to another switch device group through the same loop line.

14. A network apparatus according to claim 13 wherein each switch device comprises:

first port 1—1 for the first basic element and first port 1-2 for the second basic element, both ports exclusively for receiving data attached with destination information received from an adjacent switch device in the switch device group concerned;

second ports 2-1 and 2—2 exclusively for receiving data attached with destination information that are sent from the first or second basic element, respectively, only when that switch device is connected directly to the basic elements;

a third port and a fifth port connected to an adjacent switch device by way of a loop line;

a first decoder for judging whether data attached with destination information that have been received from said third port are communication addressed to the first basic element, communication addressed to the second basic element, or communication addressed to a basic element that is connected to another switch device group;

a repeater for repeating data attached with destination information when the first decoder has judged that the data attached with destination information are communication addressed to a basic element connected to another switch device group;

a second decoder for judging whether data attached with destination information that have been received from second port 2-1 are communication addressed to the second basic element or communication addressed to a basic element that is connected to another switch device group;

a third decoder for judging whether data attached with destination information that have been received from second port 2—2 are communication addressed to the first basic element or communication addressed to a basic element that is connected to another switch device group;

a first switch for selecting one of data attached with destination information that have been judged by the second decoder to be communication addressed to a basic element that is connected to another switch device group and data attached with destination information that have been judged by the third decoder to be communication addressed to a basic element that is connected to another switch device group;

a selector for selecting one of: data attached with destination information that have been selected by said first switch and data attached with destination information that have been supplied from said repeater and delivering the selected data by way of the fifth port;

a second switch for selecting one of: data attached with destination information that have been received from first port 1—1; data attached with destination information that have been determined by the first decoder to be communication addressed to the first basic element; and data attached with destination information that have been judged by the second decoder 4-2 to be communication addressed to the first basic element;

a third switch for selecting one of: data attached with destination information that have been received from first port 1-2; data attached with destination information that have been judged by the first decoder to be communication addressed to the second basic element; and data attached with destination information that have been judged by the second decoder to be communication addressed to the second basic element;

fourth port 4-1 for delivering data attached with destination information that have been selected by said second switch to another switch device in the same switch device group or to the first basic element; and fourth port 4-2 for delivering data attached with destination information that have been selected by said third switch to another switch device in the same switch device group or to the second basic element.

15. A network of N basic elements that each has the capability to function as one computer ($N \geq 2$), the network comprising:

N switch groups that each has N switches that are connected in series;

N loop lines that are connected to each of said N switch groups, each of said N loop lines being connected to a different one of said N switches in each of said N switch groups;

wherein each of the N basic elements is connected to a different one of said N switch groups and is directly connected to only one of said N switches therein, and wherein each of said N loop lines is directly connected to only one of said N switches that is directly connected to one of the N basic elements.

* * * * *